Patented Mar. 8, 1932

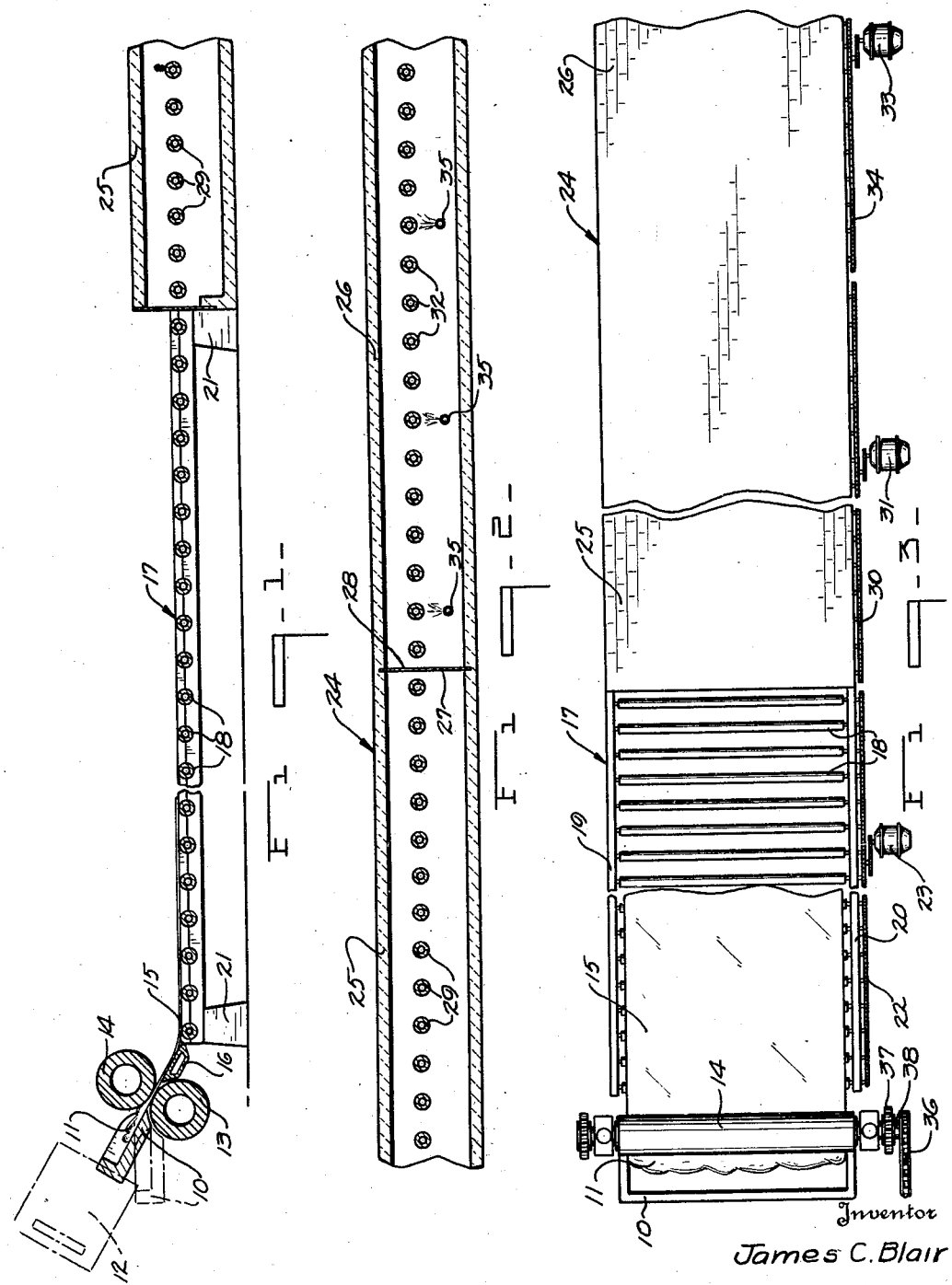

1,848,103

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING AND ANNEALING SHEET GLASS

Application filed September 18, 1929. Serial No. 393,538.

The present invention relates to an improved process and apparatus for forming and annealing sheet or plate glass.

In the manufacture of sheet glass according to one process, a plurality of successive sheets of glass are intermittently rolled at predetermined intervals from a series of charges of molten glass. The molten glass is preferably melted and refined within suitable receptacles or pots and discharged therefrom onto a receiver from where the glass is moved to and passed between a pair of forming rolls and reduced thereby to a sheet of substantially predetermined and uniform thickness. In carrying out the process just described, it is desirable, in order to increase production and improve the quality of the glass sheets, that they be formed at a relatively high rate of speed or, in other words, that the molten glass passing to the forming rolls be rapidly reduced to sheet form. While it is desirable to reduce the glass rapidly to sheet form, it is not necessary that the sheet be annealed while traveling at this same high rate of speed. In fact, such is undesirable for the reason that in this event the annealing leer necessary would have to be exceedingly long. For example, if the glass were rolled to sheet form at the rate of sixty feet per minute and should it take sixty minutes to anneal the glass, it will be seen that the length of leer necessary would have to be 3600 feet. The disadvantages incident to the construction, operation and maintenance of a leer of this length are believed to be obvious.

The object of the invention, broadly stated, is in the provision of a process and apparatus wherein glass sheets may be formed at a relatively high rate of speed and subsequently annealed while traveling at a speed relatively less than its speed of formation. Thus, the invention aims to provide a process and apparatus which will embody those advantages incident to the rapid reduction of the molten glass to sheet form and likewise those advantages which result from slower annealing of the glass.

Another object of the invention is the provision of such a process and apparatus wherein the speed of travel of the sheets subsequent to formation may be controlled in such a manner that the forward end of each sheet formed will be closely adjacent the rear end of the preceding sheet as said sheets pass through the annealing leer to the end that the leer may be utilized to its full capacity and thus render possible the elimination of large gaps between adjacent sheets.

Another object of the invention resides in the provision of such a process and apparatus wherein successive sheets of glass are formed and carried forwardly into and through an annealing leer, the glass sheet being caused to travel at variable speeds during its forward movement so as to facilitate the desired cooling and annealing thereof.

A further object of the invention is to provide such a process and apparatus wherein the glass sheet is formed at a relatively high rate of speed and carried forwardly into and through an annealing leer, said sheet being caused to travel intermittently through the leer at an average speed which is relatively less than its speed of formation.

Other objects and advantages of the invention will become more apparent during the course of the following description when taken in connection with the accompanying drawings.

In the drawings forming a part of this application and wherein like numerals are employed to designate like parts throughout the same.

Fig. 1 is a vertical longitudinal section through the forward end portion of apparatus constructed in accordance with the present invention.

Fig. 2 is a similar view of the rear end portion, and

Fig. 3 is a plan view thereof.

Referring to the drawings, the numeral 10 designates a receiver or support adapted to receive thereupon a mass or charge of molten glass 11 from a pot or receptacle 12. The molten glass is preferably deposited upon the receiver while the same is in a substantially horizontal position as indicated by the broken lines in Fig. 1, after which said receiver is tilted to its full line position so that the molten glass will be moved therefrom between the substantially superimposed sheet forming rolls 13 and 14 and reduced thereby to a sheet 15 of substantially predetermined and uniform thickness.

The glass sheet 15 issuing from between the forming rolls is received upon an inclined runway 16 which functions to guide the sheet downwardly onto a horizontally disposed conveying table 17 which may be termed the cooling section of the apparatus. This cooling section is composed of a plurality of horizontally arranged rolls 18 carried by shafts journaled at their opposite ends in the side members 19 and 20 which are supported at their opposite ends upon standards or supports 21. The rolls 18 of cooling section 17 are adapted to be driven in unison and this may be accomplished through a chain drive 22 associated with the roll shafts and driven from a variable speed motor or the like 23 or in any other desired manner.

Arranged at the end of the cooling section 17 is a relatively long tunnel-like housing designated in its entirety by the numeral 24 and divided into a transfer section 25 and an annealing section 26, the two sections being divided by a vertical partition wall 27 having a slot 28 therein through which the sheet passes from the transfer section into the annealing section. The sheet is adapted to be carried through the transfer section 25 upon a plurality of horizontally arranged rolls 29 in horizontal alignment with the rolls 18 of cooling section 17, said rolls having associated therewith a chain drive 30 operated by a variable speed motor 31.

The annealing section 26 is provided with a plurality of rolls 32 in horizontal alignment with the rolls 18 and 29 referred to above. The rolls 32 are likewise driven in unison from a separate motor 33 and chain drive 34 or by any other suitable means. The temperature of the annealing section 26 may be controlled in any preferred manner such as by the provision of a plurality of burners or the like 35. From the above, it will be seen that the rolls of the cooling section 17, transfer section 25 and annealing section 26 are driven independently of one another.

As above pointed out, it is desirable that the glass sheet 15 be formed at a relatively high rate of speed and the forming rolls 13 and 14 are consequently driven in a manner that their peripheral speed will be such that they will function to rapidly reduce the mass of molten glass to sheet form. One of the forming rolls may be positively driven by a suitable driving means 36 and the other roll driven from the positively driven roll through intermeshing gears 37 mounted upon the roll shafts 38.

In carrying the invention into practice, a mass of molten glass 11 is first placed upon the receiver 10 and then moved therefrom to the sheet forming rolls 13 and 14 and reduced thereby to a sheet 15 of substantially predetermined and uniform thickness. The glass is preferably rolled at a relatively high rate of speed say, for example, sixty feet per minute and during the rolling operation, the rolls 18 of cooling section 17 are driven at a speed equal to the speed of sheet formation, namely, sixty feet per minute so as to receive the glass sheet as it is formed and carry the same forwardly. Thus, the sheet runs out on the cooling section 17 at rolling speed until the tail or rear end thereof has cleared or passed from the runway 16. The speed of the rolls 18 is then materially reduced to say approximately ten feet per minute and the sheet is carried along at this speed for a desired length of time to allow for the required cooling and setting thereof. This cooling speed is continued until the head or forward end of the sheet approaches the transfer section 25 whereupon the speed of the rolls 18 is increased to a speed relatively greater than the speed of sheet formation, for example, to 120 feet per minute so as to feed the sheet quickly into the transfer section 25 wherein it will be supported and carried along upon rolls 29. During the feeding of the sheet into the transfer section 25, the rolls 29 of said section are synchronized with the high speed of the rolls 18 or, in other words, are also driven at a speed of 120 feet per minute to receive the sheet therefrom.

After the sheet has been entirely deposited upon the rolls 29 of transfer section 25, its speed of travel is again materially reduced to a speed less than the forming speed but preferably not quite as low as the cooling speed say, approximately fifteen feet per minute. The sheet is carried along at this speed into the annealing section 26 during which time the rolls 32 thereof are driven at the same speed as the transfer rolls 29. After the sheet has been entirely received within the annealing section 26, the rotation of the rolls 32 is stopped so as to bring the sheet to a standstill and the sheet is maintained stationary until the next sheet formed approaches the same, whereupon the rolls 32 are again synchronized with the transfer rolls 29 to receive the next sheet from the transfer section. In this manner, the sheets are caused to travel intermittently through the leer, the glass sheet remaining stationary within the leer during the formation of each succeeding sheet and traveling only during the transfer of each sheet from the transfer section into the annealing section. From the above, it will be seen that the rolls of the cooling section 17 are adapted to travel at a speed equal to the speed of sheet formation, at a relatively slower speed and also at a relatively higher speed, the rolls of the transfer section 25 being driven at a speed equal to the high speed of the cooling section and also at a slower speed, while the rolls of the annealing section 26 are adapted to travel intermittently and when traveling, to move at a speed equal to the slow speed of the transfer section. Thus, the glass sheets may be formed at a relatively high rate of speed and subsequently annealed while traveling at an average speed which is relatively less than their speed of formation. By completely stopping the sheet upon its entrance into the leer, the following sheet can close the gap between the sheets to the desired minimum before the sheet is again caused to travel through the leer. The relative speeds herein given are by way of example only and the invention is not to be construed as limited thereto since a wide range of speeds, incorporating the principle of the present invention, may be utilized.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, reducing the speed of travel of the sheet to effect the desired cooling and setting thereof, increasing the speed of travel of the sheet to a speed relatively greater than its speed of formation and delivering it at such speed into a protective enclosure, again reducing the speed of travel of the sheet after it is within such enclosure to a speed relatively less than the forming speed but not as low as the cooling speed and in delivering the sheet at such speed into an annealing zone, and in annealing the sheet while traveling intermittently through said zone at an average speed relatively less than its speed of formation.

5. In apparatus for producing sheet glass, means for reducing a mass of molten glass to sheet form, an annealing leer, and means for receiving the sheet from the forming means and conveying it into and through said leer, including a variable speed cooling section, a variable speed transfer section, and an intermittently traveling annealing section.

6. In apparatus for producing sheet glass, means for reducing a mass of molten glass to sheet form, an annealing leer, and means for receiving the sheet from the forming means and conveying it into and through said leer, including a cooling section, means for driving said section at variable speeds, a transfer section, separate means for driving said trans-